(12) United States Patent
Schlachter

(10) Patent No.: US 8,767,252 B2
(45) Date of Patent: Jul. 1, 2014

(54) SYSTEM AND METHOD FOR MERGED IMAGE ALIGNMENT IN RASTER IMAGE DATA

(75) Inventor: Lisa Schlachter, Henrietta, NY (US)

(73) Assignee: Xerox Corporation, Norwalk, CT (US)

(*) Notice: Subject to any disclaimer, the term of this patent is extended or adjusted under 35 U.S.C. 154(b) by 229 days.

(21) Appl. No.: 13/490,966

(22) Filed: Jun. 7, 2012

(65) Prior Publication Data
US 2013/0329260 A1 Dec. 12, 2013

(51) Int. Cl.
H04N 1/387 (2006.01)

(52) U.S. Cl.
USPC ............. 358/1.2; 358/1.9; 358/1.16; 358/450

(58) Field of Classification Search
CPC ..... H04N 1/387; H04N 9/3188; G06K 15/02; G06K 15/1276; G06K 2215/0002; G06K 2215/0068; G06K 2215/0077; G06K 2215/008; G06T 1/60; G06T 3/40
USPC ............. 358/1.2, 1.6, 1.9, 1.16, 450; 382/284
See application file for complete search history.

(56) References Cited

U.S. PATENT DOCUMENTS

| | | | |
|---|---|---|---|
| 5,428,804 A | 6/1995 | Davies | |
| 5,471,562 A * | 11/1995 | Shibata et al. | .................. 358/1.1 |
| 5,596,684 A | 1/1997 | Ogletree et al. | |
| 5,867,612 A | 2/1999 | Robson | |
| 5,920,685 A | 7/1999 | Romano et al. | |
| 5,940,585 A | 8/1999 | Vondran, Jr. et al. | |
| 5,999,710 A | 12/1999 | Smith et al. | |
| 6,351,275 B1 | 2/2002 | Ayling et al. | |
| 6,778,293 B1 | 8/2004 | Nacman | |
| 7,088,370 B1 | 8/2006 | Dotson et al. | |
| 7,158,127 B1 | 1/2007 | Dotson | |
| 7,557,817 B2 | 7/2009 | Soroushi et al. | |
| 7,685,212 B2 | 3/2010 | Sebot et al. | |
| 2003/0123748 A1 | 7/2003 | Sebot et al. | |
| 2003/0131030 A1 | 7/2003 | Sebot et al. | |

* cited by examiner

Primary Examiner — Marivelisse Santiago Cordero
Assistant Examiner — Kent Yip
(74) Attorney, Agent, or Firm — Maginot, Moore & Beck, LLP

(57) ABSTRACT

A method of combining digital image data from two different images in a printer enables improved precision of alignment of the image data. The method includes copying a word of first image data into a memory buffer, shifting a word of image data by a predetermined bit offset, overwriting a portion of the first image data with shifted bits from the second word of image data, and copying the shifted word of image data into the memory buffer. The printer forms a line of a printed image using the first and second image data in the memory buffer.

19 Claims, 7 Drawing Sheets

SYSTEM AND METHOD FOR MERGED IMAGE ALIGNMENT IN RASTER IMAGE DATA

TECHNICAL FIELD

The system and method disclosed in this document relates to processing of digital data for use in printers, and, more particularly, to systems and methods for printing a single page from a composite of two different sets of image data.

BACKGROUND

A wide range of printers produce printed documents from digital image data. In some instances, the digital image data represent one or more printed pages and the printer reproduces the printed pages during a print job. Some printers are also configured to merge two or more digital images together to produce a printed page that includes portions of each of the digital images. For example, in a merge operation, the printer merges an overlay digital image over a background digital image to form a single printed page with the overlay digital image merged with the background. The printer merges the image data for both the background image and the digital image to form a composite merged image prior to printing the final document. Document processing systems enable an operator to select two or more digital images and to arrange the digital images on a page in a wide range of configurations.

While existing printers can produce printed output from a combination of multiple digital images, limitations in the processing of the digital data can limit the options for how multiple digital images can be combined in a printed document. For example, many printers form images on a line-by-line basis based on a series of linear sets of binary data, which are commonly denoted as raster image data. A printer that combines two different digital images forms the raster image data with portions of both images that are arranged in the appropriate locations along the line. Existing printers can have limited resolution in positioning an overlay image on a background image in the raster line. For example, one existing printer aligns digital data only at addresses in the raster image line that are evenly divisible by sixteen bits. The digital image data can only be moved by a number of pixels corresponding to the sixteen-bit increment, resulting in a limited number of options for aligning two digital images together during a merge operation. Consequently, improvements to the manipulation of digital data in a printer to form combined printed images with improved alignment precision would be beneficial.

SUMMARY

In one embodiment, a method of operating a printer to print a single image from two different sets of image data has been developed. The method includes copying from a first memory address into a single raster line of image data a first data word having a predetermined number of bits, the first data word corresponding to first image data, identifying with reference to a value in a first offset register an address in the single raster line of image data for storage of a second data word having the predetermined number of bits, the second data word corresponding to second image data, shifting the second data word by a predetermined bit offset with reference to a value in a second offset register to generate at least one shifted bit and a shifted second data word, overwriting with the at least one shifted bit a portion of the first data word stored in the single raster line of image data, copying the shifted second data word into the single raster line of image data at the identified address, and forming one line of a printed image on an image receiving surface with reference to data stored in the single raster line of image data to generate an image corresponding to both a portion of the first image data and a portion of the second image data.

In another embodiment, a printer that is configured to print a single image from two different sets of image data has been developed. The printer includes a memory and a controller operatively connected to the memory. The memory is configured to store first image data corresponding to a first image, the first image data being stored as a first plurality of data words, each data word in the first plurality of data words having a predetermined number of bits, second image data corresponding to a second image, the second image data being stored as a second plurality of data words, each data word in the second plurality of data words having the predetermined number of bits, a single raster line of image data for printing, a first offset register for storage of a number of data words of a cross-process direction offset of the second image data in the single raster line of image data, a second offset register for storage of a number of bits of another cross-process direction offset of the second image data in the single raster line of image data. The controller is configured to copy a first data word from the first plurality of data words into the single raster line of image data, identify, with reference to the number stored in the first register, an address in the single raster line of image data for storage of a second data word from the second plurality of data words, shift the second data word by the predetermined number of bits in the second offset register to generate at least one shifted bit and a shifted second data word, overwrite with the at least one shifted bit a portion of the copy of the first data word in the single raster line of image data, copy the shifted second data word into the single raster line of image data at the identified address in the single raster line of image data, and form one line of a printed image on an image receiving surface with reference to data stored in the single raster line of image data to generate an image corresponding to both a portion of the first image data and a portion of the second image data.

BRIEF DESCRIPTION OF THE DRAWINGS

An exemplary embodiment of a method for merging image data are described, by way of example, with reference to the accompanying drawings, in which like reference numerals refer to like elements, and in which.

DETAILED DESCRIPTION

Figure 1:
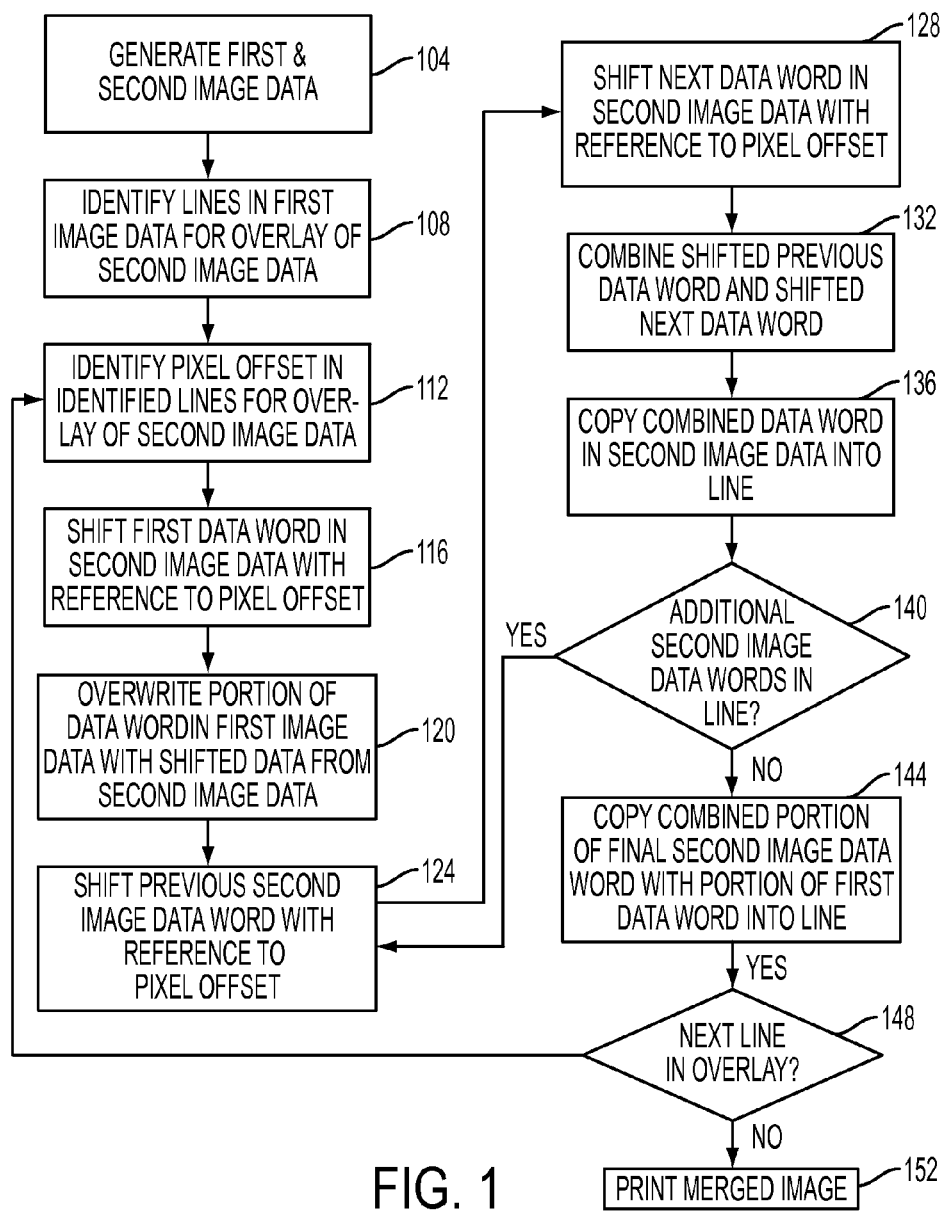
FIG. 1 is a block diagram of a process for generating merged image data.

As used herein, the terms "raster image data" and "image data" are used interchangeably and refer to binary data that correspond to a two dimensional grid including a plurality of lines. Each line in the image data is formed from a plurality of pixels that correspond to a single line of a printed image and corresponding color of the marking agent that is formed in each location of the line in the printed image. As described in more detail below, a printer can overwrite a portion of raster image data of a first image with raster image data of a second image to produce a merged image where the second image replaces a portion of the first image. During an imaging operation, the printer deposits marking agent on a line-by-line basis to form a printed image on an image receiving surface such as a print medium or an offset image receiving surface such as a drum or endless belt.

As used herein, the term "bit" refers to a single binary value that is often represented as a "0" or a "1" numerically. The bit is the smallest unit of data that is used in a digital computer, including digital controllers that are used in printers. The raster image data are represented as a plurality of bits, with each pixel in the image data being formed from one or more bits. Common image data formats form a pixel using one, two, four, or eight bits per pixel. In multi-color printers, such as cyan, magenta, yellow, and black (CMYK) printers, the image data can be separated into distinct color planes for each color of marking agent used in the printer. For example, a single pixel can include a set of eight bit pixel values that correspond to each of the cyan, magenta, yellow, and black marking colors for a single pixel location in the printed image.

Many digital controllers do not process bits individually, but instead process larger data words. As used herein, the term "data word" refers to a plurality of bits that a digital controller manipulates as a group. A digital controller can be configured to handle various data word sizes during operation. Common examples of digital controllers perform operations on digital data stored in registers that are eight, sixteen, thirty-two, and sixty-four bits in size. The size of the register represents a maximum number of bits that the digital controller can manipulate during a single operation. For example, a controller with a sixteen-bit data word size can add or subtract two sixteen-bit values held in two different sixteen-bit registers during a single operation. The data word size can also affect reading and writing of data from a memory. For example, some controllers with a sixteen-bit word size can read and write to memory addresses that are evenly divisible by the word size (e.g. evenly divisible by sixteen). Thus, the controller with the sixteen-bit data words cannot directly read or write data to an arbitrary address, such as a numeric address "8", since the arbitrary address may not be evenly divisible by sixteen.

As used herein, the terms "shift operation" or "shifting" refer to moving bits in a data word that is loaded into a register of a digital controller. During a shift operation, the data bits that are held in the register move in one of two directions, typically referred to as "left" and "right." During a right shift, the controller inserts a predetermined number of zeros beginning with the left-most bit in the register. The data in the register move right as each additional zero is shifted into the register. During a left shift operation, the controller inserts a predetermined number of zeros beginning with the right-most bit in the register. The data in the register move left as the controller shifts each zero into the register. During either a right or left shift operation, a single bit of data that is removed from the end of the register that is opposite the end of the register where the controller inserts the zero during the shift operation.

Figure 5:
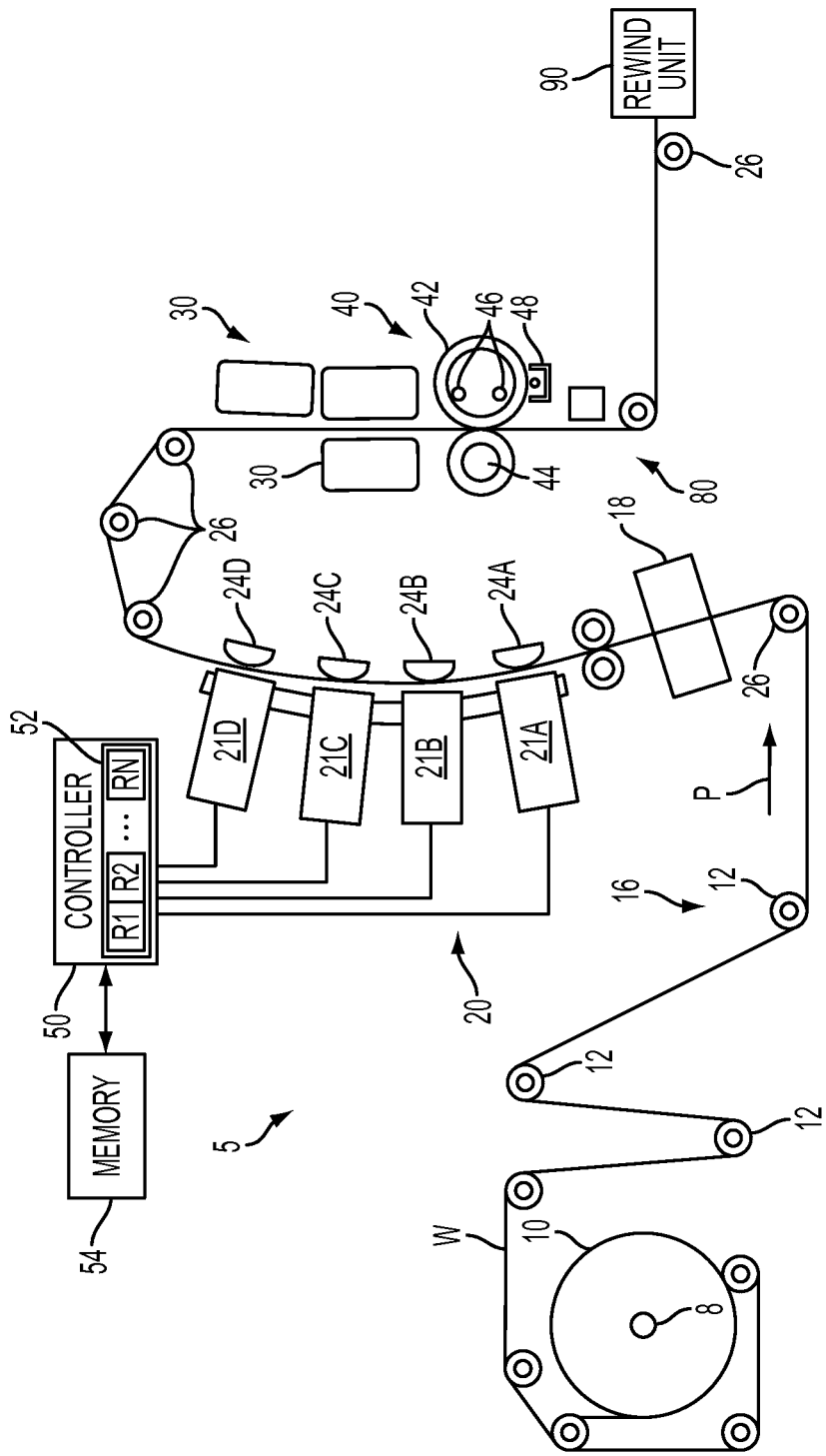
FIG. 5 is a prior art schematic diagram of an inkjet printer.

FIG. 5 depicts a prior-art inkjet printer 5. For the purposes of this disclosure, an inkjet printer employs one or more inkjet printheads to eject drops of ink into an image receiving member, such as paper, another print medium, or an indirect member such as a rotating image drum or belt. The printer 5 is configured to print ink images with a "phase-change ink," by which is meant an ink that is substantially solid at room temperature and that transitions to a liquid state when heated to a phase change ink melting temperature for jetting onto the imaging receiving member surface. The phase change ink melting temperature is any temperature that is capable of melting solid phase change ink into liquid or molten form. In one embodiment, the phase change ink melting temperature is approximately 70° C. to 140° C. In alternative embodiments, the ink utilized in the printer comprises UV curable gel ink. Gel inks are also heated before being ejected by the inkjet ejectors of the printhead. As used herein, liquid ink refers to melted phase change ink, heated gel ink, or other forms of ink, such as aqueous inks, ink emulsions, ink suspensions, ink solutions, or the like.

The printer 5 includes a controller 50 to process the image data before generating the control signals for the inkjet ejectors to eject colorants. Colorants can be ink, or any suitable substance that includes one or more dyes or pigments and that is applied to the selected media. The colorant can be black, or any other desired color, and some printer configurations apply a plurality of distinct colorants to the media. In the configuration of FIG. 5, the printer 5 ejects cyan, magenta, yellow, and black (CMYK) inks onto the media web to form color ink images. The media includes any of a variety of substrates, including plain paper, coated paper, glossy paper, or transparencies, among others, and the media can be available in sheets, rolls, or other physical formats.

The printer 5 is an example of a direct-to-sheet, continuous-media, phase-change inkjet printer that includes a media supply and handling system configured to supply a long (i.e., substantially continuous) web of media W of "substrate" (paper, plastic, or other printable material) from a media source, such as spool of media 10 mounted on a web roller 8. For simplex printing, the printer 5 passes the media web W through a media conditioner 16, print zone 20, printed web conditioner 80, and rewind unit 90 once. In the simplex operation, the media source 10 has a width that substantially covers the width of the rollers over which the media travels through the printer.

The media web W is unwound from the source 10 as needed and a variety of motors, not shown, rotate one or more rollers 12 and 26 to propel the media web W. The media conditioner includes rollers 12 and a pre-heater 18. The rollers 12 and 26 control the tension of the unwinding media as the media moves along a path through the printer. In alternative embodiments, the printer transports a cut sheet media through the print zone in which case the media supply and handling system includes any suitable device or structure to enable the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media is transported through a print zone 20 that includes a series of color printhead modules or units 21A, 21B, 21C, and 21D, each printhead unit effectively extends across the width of the media and is able to eject ink directly (i.e., without use of an intermediate or offset member) onto the moving media. In printer 5, each of the printheads ejects a single color of ink, one for each of the colors typically used in color printing, namely, cyan, magenta, yellow, and black (CMYK) for printhead units 21A, 21B, 21C, and 21D, respectively.

The controller 50 of the printer receives velocity data from encoders mounted proximately to rollers positioned on either side of the portion of the path opposite the four printheads to calculate the linear velocity and position of the web as the web moves past the printheads. The controller 50 uses these data to generate firing signals for actuating the inkjet ejectors in the printheads to enable the printheads to eject four colors of ink with appropriate timing and accuracy for registration of the differently colored patterns to form color images on the media. The inkjet ejectors actuated by the firing signals correspond to digital data processed by the controller 50.

The digital data for the images to be printed can be transmitted or otherwise generated and delivered to the printer, with a scanner that is a component of the printer, through a network interface device that is connected to an external computer, through removable data storage devices such as solid state or optical storage media. As is described in more detail below, multiple sets of image data can be merged into a single printed image. In various configurations, a color unit for each primary color includes one or more printheads; multiple printheads in a module are formed into a single row or multiple row array; printheads of a multiple row array are staggered; a printhead prints more than one color; or the printheads or portions thereof are mounted movably in a direction transverse to the process direction P for printing operations, such as for spot-color applications and the like. While the printhead units in the printer 5 are configured to eject liquid drops of a phase change ink onto the media web W, a similar configuration of inkjets that print solvent inks, aqueous inks, or any other liquid ink can be used to generate ink images as described herein.

Associated with each color unit is a backing member 24A-24D, typically in the form of a bar or roll, which is arranged substantially opposite the printhead on the back side of the media. Each backing member positions the media at a predetermined distance from the printhead opposite the backing member. The backing members 24A-24D are optionally configured to emit thermal energy to heat the media to a predetermined temperature, which is in a range of about 40° C. to about 60° C. in printer 5. The various backer members can be controlled individually or collectively. The pre-heater 18, the printheads, backing members 24A-24D (if heated), as well as the surrounding air combine to maintain the media along the portion of the path opposite the print zone 20 in a predetermined temperature range of about 40° C. to 70° C.

As the partially-imaged media web W moves to receive inks of various colors from the printheads of the print zone 20, the printer 5 maintains the temperature of the media web W within a given range. The printheads in the color units 21A-21D eject ink at a temperature typically significantly higher than the temperature of the media web W. Consequently, the ink heats the media, and temperature control devices can maintain the media web temperature within a predetermined range. For example, the air temperature and air flow rate behind and in front of the media web W impacts the media temperature. Accordingly, air blowers or fans can be utilized to facilitate control of the media temperature. Thus, the printer 5 maintains the temperature of the media web W within an appropriate range for the jetting of all inks from the printheads of the print zone 20. Temperature sensors (not shown) can be positioned along this portion of the media path to enable regulation of the media temperature.

Following the print zone 20 along the media path are one or more "mid-heaters" 30. A mid-heater 30 can use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 applies heat and/or pressure to the media to fix the images to the media. The fixing assembly includes any suitable device or apparatus for fixing images to the media including heated or unheated pressure rollers, radiant heaters, heat lamps, and the like. In the embodiment of the FIG. 5, the fixing assembly includes a "spreader" 40, that applies a predetermined pressure, and in some implementations, heat, to the media. The function of the spreader 40 is to flatten the individual ink droplets, strings of ink droplets, or lines of ink on web W and flatten the ink with pressure and, in some systems, heat. The spreader flattens the ink drops to fill spaces between adjacent drops and form uniform images on the media web W. In addition to spreading the ink, the spreader 40 improves fixation of the ink image to the media web W by increasing ink layer cohesion and/or increasing the ink-web adhesion. The spreader 40 includes rollers, such as image-side roller 42 and pressure roller 44, to apply heat and pressure to the media. Either roller can include heat elements, such as heating elements 46, to bring the web W to a temperature in a range from about 35° C. to about 80° C. In alternative embodiments, the fixing assembly spreads the ink using non-contact heating (without pressure) of the media after the print zone 20. Such a non-contact fixing assembly can use any suitable type of heater to heat the media to a desired temperature, such as a radiant heater, UV heating lamps, and the like.

In one practical embodiment, the roller temperature in spreader 40 is maintained at an optimum temperature that depends on the properties of the ink, such as 55° C. Generally, a lower roller temperature gives less line spread while a higher temperature produces imperfections in the gloss of the ink image. Roller temperatures that are too high may cause ink to offset to the roll. In one practical embodiment, the nip pressure is set in a range of about 500 to about 2000 psi lbs/side. Lower nip pressure produces less line spread while higher pressure may reduce pressure roller life.

The spreader 40 can include a cleaning/oiling station 48 associated with image-side roller 42. The station 48 cleans and/or applies a layer of some release agent or other material to the roller surface. The release agent material can be an amino silicone oil having viscosity of about 10-200 centipoises. A small amount of oil transfers from the station to the media web W, with the printer 5 transferring approximately 1-10 mg per A4 sheet-sized portion of the media web W. In one embodiment, the mid-heater 30 and spreader 40 are combined into a single unit, with their respective functions occurring relative to the same portion of media simultaneously. In another embodiment the media is maintained at a high temperature as the media exits the print zone 20 to enable spreading of the ink.

Following passage through the spreader 40 the printed media can be wound onto a roller in the rewind unit 90 for removal from the system during simplex printing, or is directed to a duplexing unit for second-side printing in a duplex print mode. One configuration of the printer 5 winds the simplex or duplex printed media onto a roller for removal from the system by rewind unit 90. Alternatively, the media can be directed to other processing stations that perform tasks such as cutting, binding, collating, and/or stapling the media or the like.

In printer 5, the controller 50 is operatively connected to various subsystems and components to regulate and control operation of the printer 5. The controller 50 is implemented with general or specialized programmable processors that execute programmed instructions. A memory 54 stores programmed instructions and also stores various data used in the configuration and operation of the printer 5. As described below, the memory 54 stores image data corresponding to two different images to be merged and printed on the media web W with printheads in the color units 21A-21D. The controller 50 reads data from the memory 54 into a plurality of registers 52. In the exemplary embodiment of FIG. 5, each of the registers 52 is a sixteen-bit register, and the controller 50 is configured to perform operations on sixteen bit image data including left and right shift operations and logical OR operations. The controller 50 is also configured to read image data from the memory 54 into the registers 52, and to write image data from the registers 52 into the memory 54. In one embodiment, the controller 50 is configured to read and write to addresses in the memory 54 that are evenly divisible by the sixteen-bit data word size of the registers 52, but not to intermediate memory address locations.

The processors, their memories, and interface circuitry configure the controller 50 and/or print engine to perform the printer operations. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits. The controller 50 is operatively connected to the print bar and printheads in the color units 21A-21D in order to generate electrical firing signals for operation of the inkjets to form ink images on the media web W.

The imaging system 5 of FIG. 5 is merely illustrative of one embodiment of an imaging system that forms printed images on a print medium with two merged printed images. Alternative inkjet printers include inkjet printers that form images with different forms of ink including aqueous inks, solvent inks, ultraviolet (UV) curable inks, and the like. Alternative inkjet printers additionally include printers that form images on individual media sheets instead of a continuous web, and indirect printers that form the merged printed images on a drum or belt prior to transferring the images to a print medium. Alternative imaging systems include, but are not limited to, xerographic printers.

FIG. 1 is a block diagram of a process 100 for merging second raster image data over first raster image data during an imaging operation with a printer. In the discussion below, a reference to the process performing a function or action refers to a controller executing programmed instructions stored in a memory to operate one or more components of the printer to perform the function or action. Process 100 refers to the printer 5 of FIG. 5 for illustrative purposes. In the exemplary configuration of process 100, the controller 50 in the printer 5 operates with sixteen-bit data words and processes raster image data with eight bits of image data representing each pixel.

Process 100 begins with generation of first and second raster image data for printing onto an image receiving surface during an imaging operation (block 104). The first raster image data correspond to a background image and the second raster image data correspond to an overlay image. The second raster image data overlay a portion of the first raster image data to replace a portion of the first image with the second image in the printed document. The first raster image data and second raster image data are both stored in separate portions of the memory 54.

During process 100, the printer identifies lines in the raster image data where the second raster image data merge with the first raster image data (block 108). The printer 5 identifies the first line of the first raster image data where the merge begins with reference to an offset value that is stored in the memory 54 and is loaded into one of the registers 52 in the controller 50. The first offset value is a process direction offset value that identifies the first line of raster image data where the second raster image data overlie the first raster image data.

Process 100 also identifies a pixel offset in the next line corresponding to a location where the second raster image data overlays the first raster image data (block 112). Two of the registers 52 in the controller 50 store offset values corresponding to the pixel offset. The first offset register stores a number of data words into the line corresponding to the offset, and a second offset register stores a number of individual pixels beyond the data word of the offset. For example, in the printer 5 with a sixteen-bit data word and operating with eight bit per pixel image data, the first register stores a value of "1" and the second register stores a value of "8" to indicate that the second raster image data merges with the first raster image data line starting at a memory address value "24" corresponding to sixteen bits per word and one additional eight-bit pixel beyond the boundary of the word in memory. The controller 50 identifies a single pixel offset value for the second raster image data in each line of the merged image with reference to the data word and individual pixel values in the offset registers 52.

Figure 2:
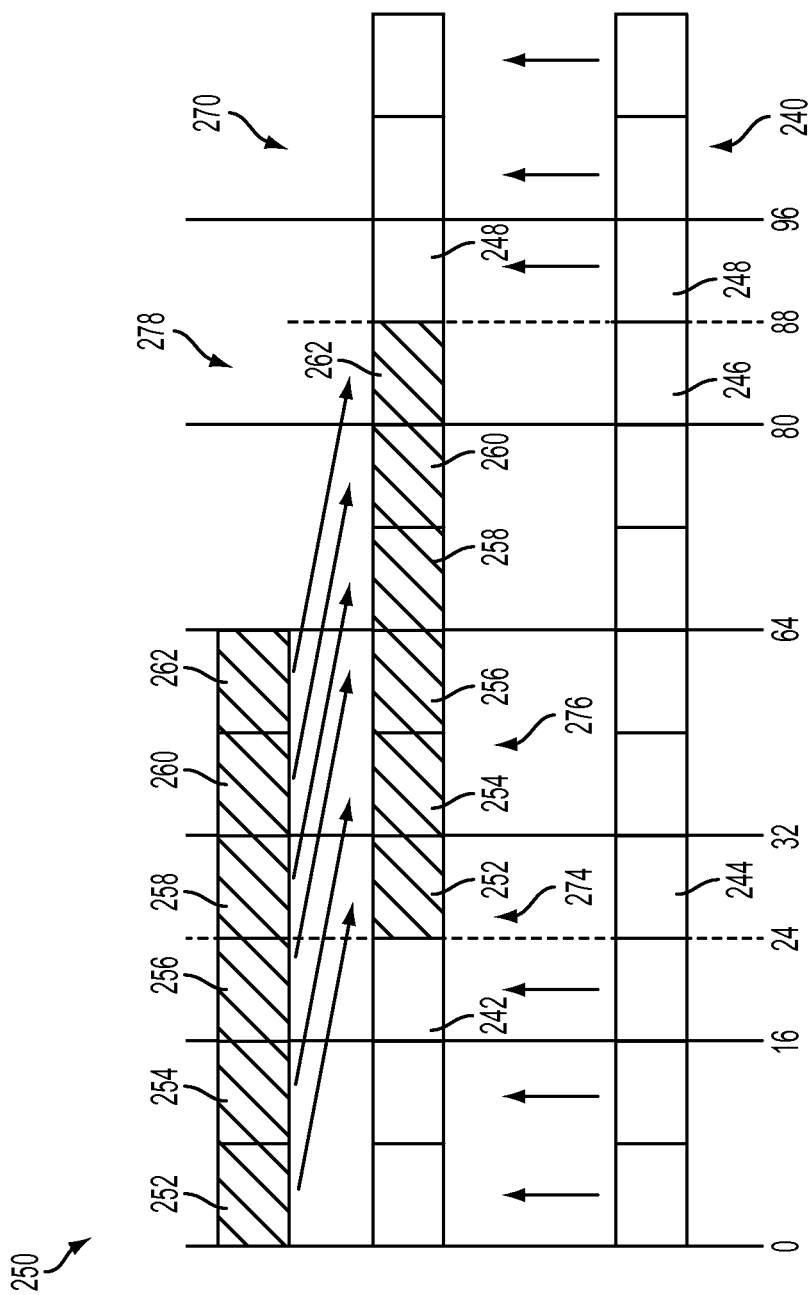
FIG. 2 is a diagram depicting first and second rasterized image data.

In the example of process 100 with each pixel including eight bits of data, the second register stores a value of "0" when the second image data offset aligns with a sixteen-bit data word boundary, or an "8" when the second image data offset aligns with an address that is between two different data word boundaries. As depicted in FIG. 2, a raster line of first raster image data 240 is aligned on sixteen-bit data word boundaries at memory address offsets 0, 16, 32, 64, 80, and 96. Second image data 250 are stored in a separate portion of the memory 54, but are also stored in alignment with the sixteen-bit data word boundaries. The value of the first pixel offset register corresponds to memory address 16, and the value of the second pixel offset register is "8" to indicate a single pixel offset within the data word. In the combined image data line 270, the controller 50 copies the second raster image data 250 into the image data line 270 beginning at memory address 24, which is located between the sixteen-bit word boundaries of address 16 and address 32. One pixel 242 in the first raster image data 240 is located adjacent to a first pixel 252 in the second raster image data 250 in the data word 274 between addresses 16 and 32, while another pixel 262 in the second raster image data 250 is located next to a pixel 248 of the first raster image data 240 in another data word 278 between addresses 80 and 96. In the printer 5, the controller 50 is configured to read and write data only to memory addresses that correspond to data word boundaries. As described below, the controller 50 shifts data corresponding to individual pixels to generate the raster image data line 270 that includes the first raster image data 240 and the second raster image data 250.

Figure 3A:
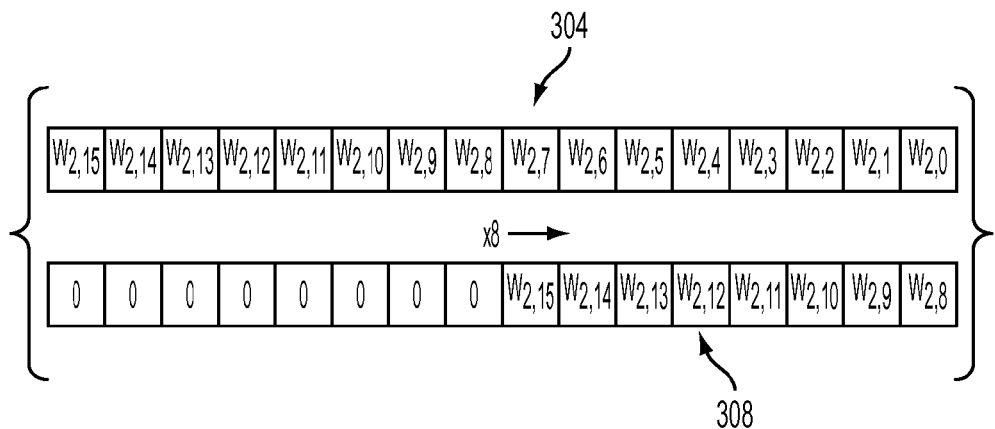
FIG. 3A is a diagram depicting a shift operation applied to image data in a register.

Referring to FIG. 1 and FIG. 3A, process 100 continues by shifting the first data word in the second raster image data by a number of bits corresponding to the pixel offset stored in the second register (block 116). In FIG. 3A, a data word 304 in the second raster image data are represented with sixteen bits, $W_{2,15}$-$W_{2,0}$. The controller 50 loads the data word 304 from the memory 54 into one of the registers 52, and then performs a right shift operation on the data word. In the example of FIG. 3A, the right shift operation shifts the data word by 8 bits corresponding to the number of bits stored in a single eight-bit pixel. The shifted data word 308 includes eight zeros and the left-most bits ($W_{2,15}$-$W_{2,8}$) of the original register contents of the data word 304.

Figures 1, 3B:
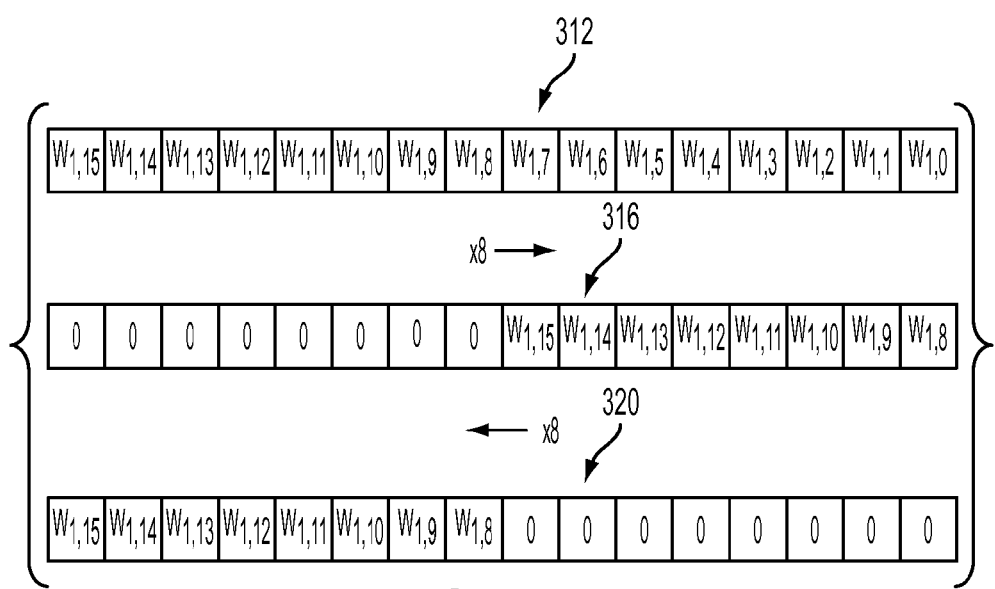
FIG. 3B is a diagram depicting and operation to overwrite a portion of image data in one register with image data from another register.
Figures 2, 3B:
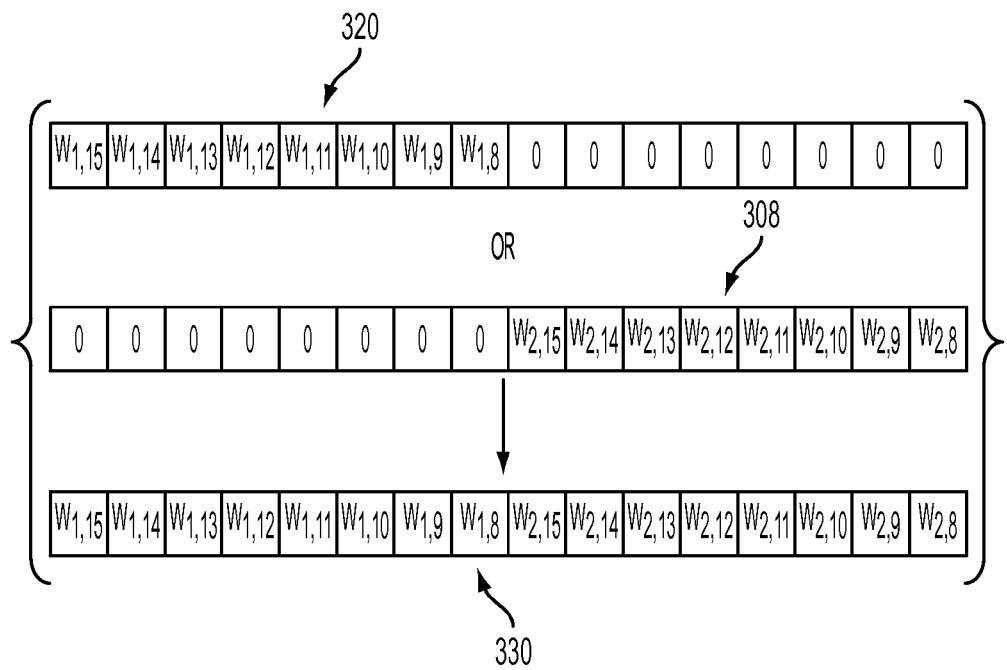

Process 100 continues by overwriting a portion of the first raster image data with the shifted second image data word (block 120). In FIG. 2, the raster image data line 270 contains a single data word 274 including a pixel 242 from the first raster image data 240 and a pixel 252 from the second raster image data 250. Process 100 overwrites the second pixel 244 in the first raster image data 240 with the pixel 252 from the second image data 250 to generate the data word 274. FIG. 3B depicts an exemplary method for overwriting the image data using the controller 50. In FIG. 3B, the data word 312 from the first raster image data includes bits $W_{1,15}$-$W_{1,0}$. The controller 50 first shifts the data word 312 right by 8 bits to produce the shifted data word 316, and then shifts the data word 316 left by 8 bits to produce the shifted data word 320. The shifted data word 320 includes only the bits $W_{1,15}$-$W_{1,8}$ from the first raster image data word 312. To overwrite the first raster image data, the controller performs a logical OR operation between the shifted data word 320 of the first raster image data and the shifted data word 308 of the second raster image data to produce the combined data word 330. As depicted in FIG. 3B, the data word 330 includes one pixel from the first raster image data in bits $W_{1,15}$-$W_{1,8}$ and one pixel from the second raster image data in bits $W_{2,15}$-$W_{2,8}$. The controller 50 copies the data word 330 in the line of raster image data in the memory 54 at a memory address, which is adjacent to the first raster image data, such as address 16 in FIG. 2. Thus, process 100 enables the controller 50 to merge the second raster image data and the first raster image data with single-pixel precision even when the offset value does not correspond to a data word boundary in the memory 54.

Figures 1, 3C:
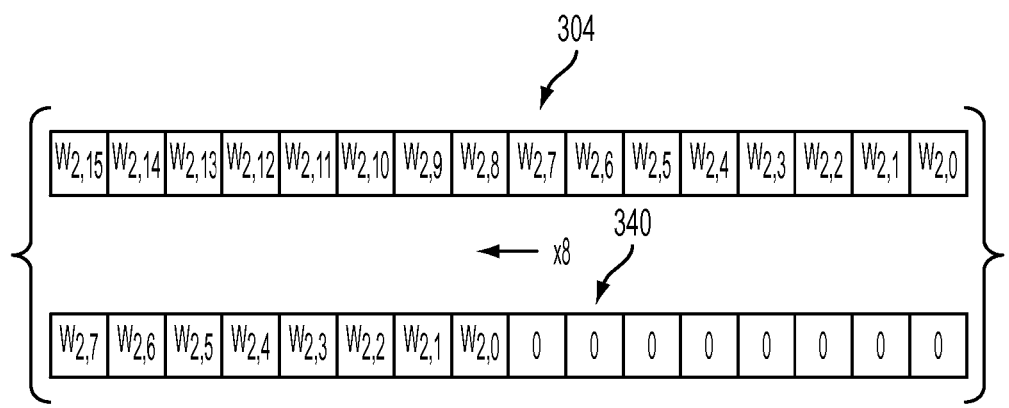
FIG. 3C is a diagram depicting two shift operations applied to image data in two different registers.
Figures 2, 3C:
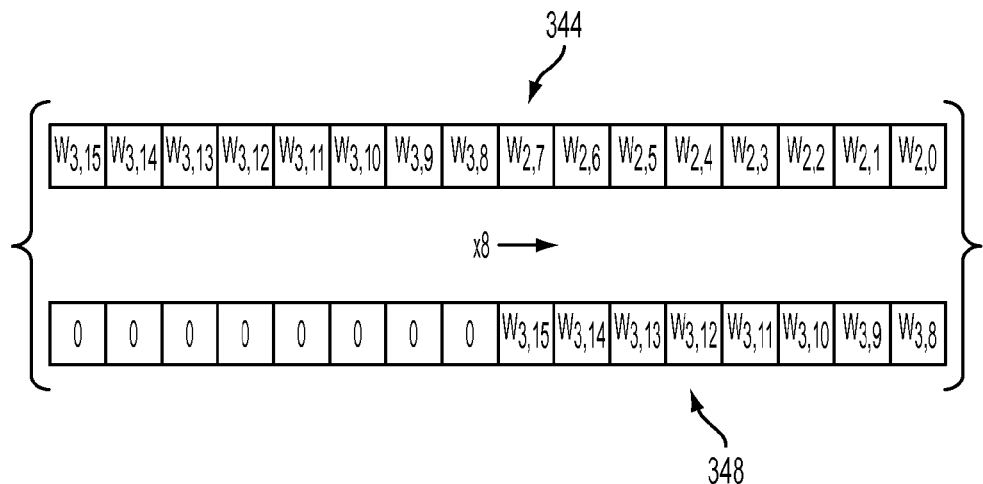

Process 100 continues to copy the second raster image data into the line with the identified pixel offset. The controller 50 operates on each set of adjacent data words in the second raster image data by shifting the previous data word in the second raster image data with reference to the pixel offset value (block 124), and shifting the next data word in the second raster image data with reference to the pixel offset value (block 128). For example, in FIG. 2, the first data word in the second raster image data includes pixels 252 and 254, and the second data word in the second raster image data includes pixels 256 and 258. The controller 50 copies both the first and second data words into the registers 52. As depicted in FIG. 3C, the controller 50 left shifts the first word 304 in the second raster image data by eight bits to generate shifted data word 340, and right shifts the image data in the second data word 344 to right by eight bits to generate shifted data word 348. The first shifted data word 340 includes bits $W_{2,7}$-$W_{2,0}$. The next shifted data word 348 includes bits $W_{3,15}$-$W_{3,0}$.

Figure 3D:
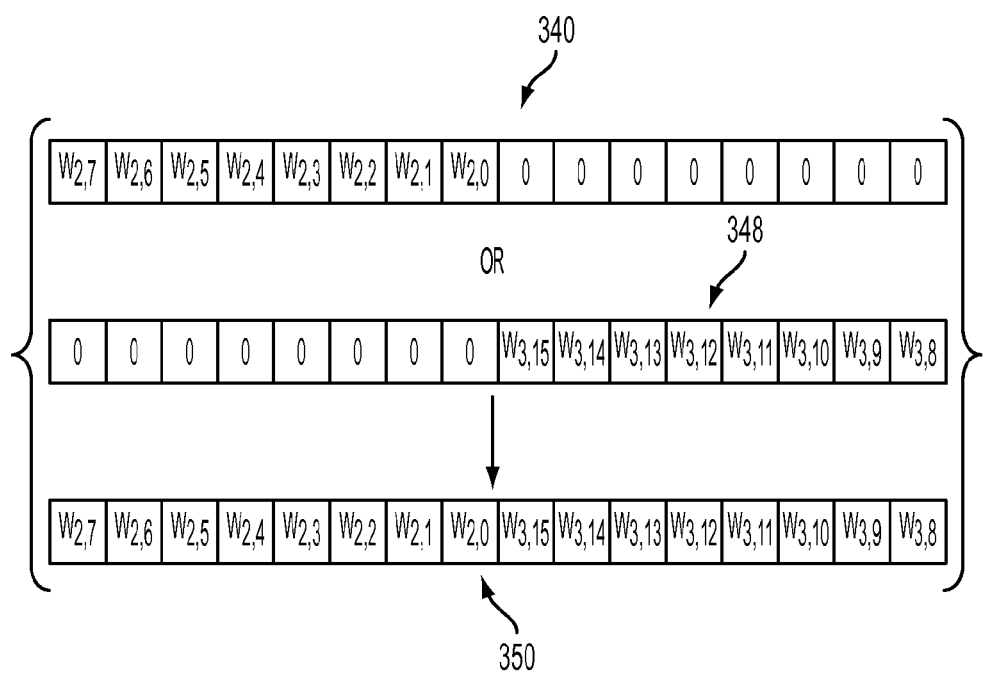
FIG. 3D is a diagram depicting a combination of the shifted data in the registers of FIG. 3C into a single register.

Process 100 generates the next data word in the line of merged first and second raster data as a combination of the shifted data generated from the previous data word and the shifted data generated from the next data word (block 132). As depicted in FIG. 3D, the controller 50 performs a logical OR operation between the shifted data word 340 and shifted data word 348 to generate data word 350. Referring to FIG. 2, the controller 50 copies the image data in the data word 350 into the raster image data line 270 at an address that is adjacent to the previous data word including the first and second raster image data (block 136). In the example of FIG. 2, the data word 276 includes pixels 254 and 256 from the second raster image data 250 and the data word 276 is adjacent to the data word 274 in the raster image line 270. The controller 50 copies the data word 276 into address 32 in the line 270. Process 100 continues to shift and copy the remaining second raster image data into the line of raster image data in an iterative manner as described with reference to the processing of blocks 124-136 (block 140).

After copying the second raster image data into the raster image line, process 100 combines a portion of the final data word in the second raster image data with the first raster image data (block 144). For example, in FIG. 2, the final data word in the second raster image data 250 includes pixels 260 and 262. The data word from the first raster image 240 data that is located after the end of the second raster image data 250 includes pixels 246 and 248. Process 100 combines pixel 262 with pixel 248 into a single data word 278, and copies the data word 278 in the image data line 270. The controller 50 combines the final pixel 262 in the second raster image data with the pixel 248 from the first raster image data with the same processing as described above with reference to blocks 124-132. The controller 50 copies the combined data word into the raster image data line at an address that is adjacent to the second raster image data.

Figure 4:
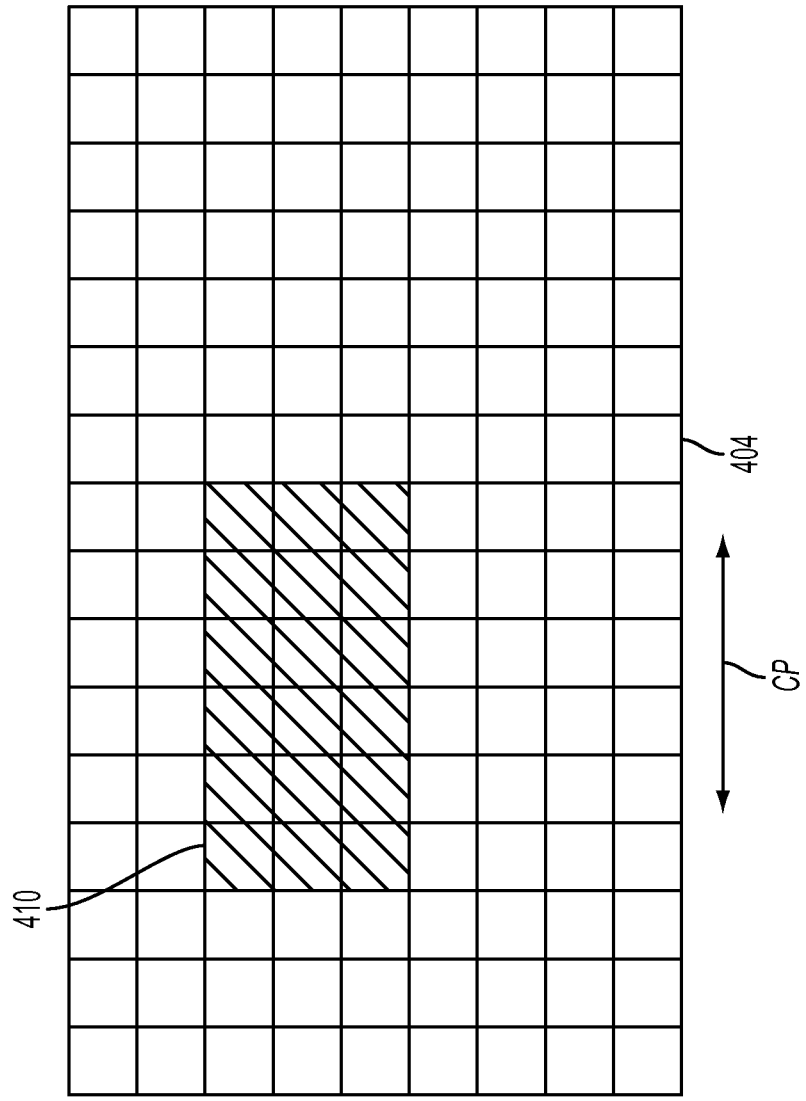
FIG. 4 is a schematic view of pixels in combined image data that are generated from two different sets of image data.

Process 100 continues for any additional lines in the first and second raster image data (block 148). In each line, the corresponding line of second raster image data replaces a portion of the first raster image data. In an example depicted in FIG. 4, the second raster image data 410 are merged with the first raster image data 404. The controller 50 replaces a portion of the first raster image data 404 with the second raster image data 410 during the merge operation. The location of the second raster image data 410 in the cross-process direction axis CP can be selected with a precision of a single pixel in the image data. The printer 5 uses the combined first and second raster image data to form an ink image on the media web W (block 152).

While process 100 is described with a printer using a sixteen-bit data word size and eight bit pixel data for illustrative purposes, other data word sizes and pixel data sizes are also suitable for use with process 100. For example, alternative printers can include larger or smaller data word sizes, such as eight, thirty-two, and sixty-four bit data words. Additionally, the number of pixels in a data word is determined with reference to the number of bits used to represent each pixel. For example, image data that represent each pixel with four bits of data, includes four pixels in each sixteen-bit data word in the printer 5. The pixel offset within each data word can be up to three pixels. If the image data represent each pixel with two bits of data, then each data word can be have up to eight pixels and the pixel offset within each data word can be up to seven pixels. If the image data represent each pixel with a single bit, then each data word can have up to sixteen pixels and the pixel offset within each data word can be up to fifteen pixels.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also encompassed by the following claims.

What is claimed:

1. A method of manipulating image data in a printer comprising:

copying from a first memory address into a single raster line of image data a first data word having a predetermined number of bits, the first data word corresponding to first image data;

identifying with reference to a value in a first offset register an address in the single raster line of image data for storage of a second data word having the predetermined number of bits, the second data word corresponding to second image data;

shifting with reference to a value in a second offset register the second data word by a predetermined bit offset to generate at least one shifted bit and a shifted second data word;

overwriting with the at least one shifted bit a portion of the first data word stored in the single raster line of image data;

copying the shifted second data word into the single raster line of image data at the identified address; and forming one line of a printed image on an image receiving surface with reference to data stored in the single raster line of image data to generate an image corresponding to both a portion of the first image data and a portion of the second image data.

2. The method of claim 1 further comprising:

shifting a third data word in the second image data by a predetermined bit offset with reference to the value in the second offset register to generate another at least one shifted bit and a shifted third data word;

overwriting with the at least one other shifted bit a portion of the shifted second data word in the single raster line of image data; and copying the shifted third data word into the single raster line of image data at an address that is adjacent to the address where the shifted second data word is stored in the single raster line of image data.

3. The method of claim 1, wherein the portion of the first data word copied into the single raster line of image data and overwritten by the at least one shifted bit is adjacent to the address of the shifted second word in the single raster line of image data.

4. The method of claim 1, the first data word and the second data word each having a size of sixteen bits.

5. The method of claim 1, the predetermined bit offset for shifting the second data word corresponds to a number of bits in a single pixel of the second image data.

6. The method of claim 5, the single pixel of the second image data including one bit of image data.

7. The method of claim 5, the single pixel of the second image data including two bits of image data.

8. The method of claim 5, the single pixel of the second image data including four bits of image data.

9. The method of claim 5, the single pixel of the second image data including eight bits of image data.

10. A printer comprising:

a memory configured to store:

first image data corresponding to a first image, the first image data being stored as a first plurality of data words, each data word in the first plurality of data words having a predetermined number of bits;

second image data corresponding to a second image, the second image data being stored as a second plurality of data words, each data word in the second plurality of data words having the predetermined number of bits;

a single raster line of image data for printing;

a first offset register for storage of a number of data words of a cross-process direction offset of the second image data in the single raster line of image data; and a second offset register for storage of a number of bits of another cross-process direction offset of the second image data in the single raster line of image data; and a controller operatively connected to the memory and configured to:

copy a first data word from the first plurality of data words into the single raster line of image data;

identify, with reference to the number stored in the first register, an address in the single raster line of image data for storage of a second data word from the second plurality of data words;

shift the second data word by the predetermined number of bits in the second offset register to generate at least one shifted bit and a shifted second data word;

overwrite with the at least one shifted bit a portion of the copy of the first data word in the single raster line of image data;

copy the shifted second data word into the single raster line of image data at the identified address in the single raster line of image data; and form one line of a printed image on an image receiving surface with reference to data stored in the single raster line of image data to generate an image corresponding to both a portion of the first image data and a portion of the second image data.

11. The printer of claim 10, the controller being further configured to:

shift a third data word in the second plurality of data words by the predetermined number of bits in the second offset register to generate another at least one shifted bit and a shifted third data word;

overwrite a portion of the shifted second data word in the single raster line of image data with the other at least one shifted bit; and copy the shifted third data word into the single raster line of image data at an address that is adjacent to the address of the copy of the shifted second data word in the single raster line of image data.

12. The printer of claim 10, wherein the portion of the first data word overwritten by the controller with the at least one shifted bit is adjacent to the address of the shifted second word in the single raster line of image data.

13. The printer of claim 10, the first data word and the second data word each having a size of sixteen bits.

14. The printer of claim 10, the predetermined bit offset for shifting the second data word corresponding to a single pixel of the second image data.

15. The printer of claim 14, the single pixel of the second image data including one bit of image data.

16. The printer of claim 14, the single pixel of the second image data including two bits of image data.

17. The printer of claim 14, the single pixel of the second image data including four bits of image data.

18. The printer of claim 14, the single pixel of the second image data including eight bits of image data.

19. The printer of claim 10 further comprising:

a plurality of inkjets configured to eject ink onto an image receiving surface; and the controller being operatively connected to the plurality of ink jets and further configured to:
  generate a plurality of firing signals for the plurality of inkjets to eject a plurality of ink drops in the one line of the printed image on the image receiving surface with reference to data stored in the single raster line of image data.

\* \* \* \* \*